United States Patent
Wei et al.

(10) Patent No.: US 12,473,888 B2
(45) Date of Patent: Nov. 18, 2025

(54) POWER PRODUCTION FORECAST BASED WIND TURBINE CONTROL

(71) Applicant: VESTAS WIND SYSTEMS A/S, Aarhus N. (DK)

(72) Inventors: Mu Wei, Solbjerg (DK); Thair Mahmoud, Williams Landing (AU); Jacob Quan Kidmose, Risskov (DK); Manas Patankar, Glen Huntly (AU); Hugh McKenzie, Middle Park (AU); Antonio Martinez, Oakleigh South (AU)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 396 days.

(21) Appl. No.: 17/928,609

(22) PCT Filed: May 5, 2021

(86) PCT No.: PCT/DK2021/050141
§ 371 (c)(1),
(2) Date: Nov. 29, 2022

(87) PCT Pub. No.: WO2021/239195
PCT Pub. Date: Dec. 2, 2021

(65) Prior Publication Data
US 2023/0193874 A1 Jun. 22, 2023

(30) Foreign Application Priority Data
May 29, 2020 (DK) .......................... PA 2020 70348

(51) Int. Cl.
*F03D 7/02* (2006.01)
*H02J 3/00* (2006.01)
*H02J 3/38* (2006.01)

(52) U.S. Cl.
CPC ............ *F03D 7/0284* (2013.01); *H02J 3/004* (2020.01); *H02J 3/381* (2013.01); *F05B 2270/1033* (2013.01); *H02J 2300/28* (2020.01)

(58) Field of Classification Search
CPC ......... F03D 7/0284; H02J 3/004; H02J 3/381; H02J 2300/28; F05B 2270/1033; Y02E 10/72
See application file for complete search history.

(56) References Cited

U.S. PATENT DOCUMENTS

| | | | | |
|---|---|---|---|---|
| 7,523,001 | B2 * | 4/2009 | Morjaria | F03D 7/0284 702/182 |
| 8,346,400 | B2 * | 1/2013 | Gonzalez | H02J 3/48 290/44 |

(Continued)

FOREIGN PATENT DOCUMENTS

| | | |
|---|---|---|
| CN | 108306312 A | 7/2018 |
| WO | 2009024833 A1 | 2/2009 |
| WO | 2018153526 A1 | 8/2018 |

OTHER PUBLICATIONS

International Search Report and Written Opinion for PCT Application No. PCT/DK2021/050141, dated Jul. 21, 2021.

(Continued)

*Primary Examiner* — Ziaul Karim
(74) *Attorney, Agent, or Firm* — Patterson + Sheridan, LLP; Gero G. McClellan

(57) ABSTRACT

A method is provided for determining a power production capacity of at least one wind turbine connected to a power grid. The method includes receiving, e.g. from a power grid control center, a power production forecast for the at least one wind turbine, and then monitoring an actual grid frequency of the power grid. Based on the actual grid frequency and a nominal grid frequency, a frequency support power reserve is determined. The power production capacity is then (Continued)

determined in dependence of the determined frequency support power reserve and the power production forecast.

10 Claims, 2 Drawing Sheets

(56) References Cited

U.S. PATENT DOCUMENTS

| | | | | |
|---|---|---|---|---|
| 9,915,243 B2* | 3/2018 | Sagi | ............... | G05B 15/02 |
| 2011/0057445 A1* | 3/2011 | Acedo | ............... | F03D 7/0284 |
| | | | | 290/44 |
| 2015/0318705 A1* | 11/2015 | Lucas | ............... | H02J 3/48 |
| | | | | 307/129 |
| 2017/0337495 A1* | 11/2017 | Ghosh | ............... | H02J 3/46 |

OTHER PUBLICATIONS

Danish Patent Office, Search Opinion for Danish Patent Application No. PA 2020 70348, dated Oct. 13, 2020.
Danish Patent Office, Search Report for Danish Patent Application No. PA 2020 70348, dated Oct. 13, 2020.

* cited by examiner

POWER PRODUCTION FORECAST BASED WIND TURBINE CONTROL

TECHNICAL FIELD

The present invention relates to a method of controlling at least one wind turbine connected to a power grid, to a power plant controller and to a wind farm.

BACKGROUND

Power production by wind turbines is one of the inexhaustible alternatives of energy generation. A wind turbine's power production is directly related to the wind speed at the location of the wind turbine and may thus vary over time. The volatile power contribution provided by wind farms makes it more difficult to ensure the stability of the power grid. With the growing popularity of wind energy, power grid stability is an increasing point of concern. Accurate wind farm power production forecasts are thus of high importance for maintaining the stability of the power grid.

Power production forecasts can, e.g., be based on wind farm characteristics and projected wind speeds. In, e.g., the international patent publication published as WO 2019/238285 A1, a strategy is disclosed for centrally generating wind farm power production forecasts and locally updating such forecasts using site specific and locally gathered data. This strategy aims to improve the accuracy of power production forecasts and to control wind farms in such a way as to improve the stability of the power grid as a whole. However, even with such forecasting and control strategies, local weather variations, mechanical problems and grid imbalances caused by other power plants on the same power grid, still causes discrepancies between the forecasts and actual power production, resulting in a risk of the wind farm delivering less or more power than possible or expected. The grid frequency imbalance this may cause may lead to additional costs for the buy in of frequency control services. Inaccurate forecasts may thus lead to power production loss, reduced profits and, in some cases, penalty payments that may have to be paid when delivering significantly more or less electric power than agreed beforehand. With a more accurate power production forecast, the wind farm can be allowed to operate closer to its theoretical maximum output level, i.e. the maximum amount of electric power that, given the local weather conditions, could have been produced in the absence of any restrictions related to the capacity of and connection to the larger power grid.

It is an aim of the present invention to address one or more disadvantages associated with the prior art.

SUMMARY OF THE INVENTION

According to an aspect of the invention there is provided a method of determining a power production capacity of at least one wind turbine connected to a power grid. The method includes receiving, e.g. from a power grid control centre, a power production forecast for the at least one wind turbine, and then monitoring an actual grid frequency of the power grid. Based on the actual grid frequency and a nominal grid frequency, a frequency support power reserve is determined. The power production capacity is then determined in dependence of the determined frequency support power reserve and the power production forecast.

By taking into account the frequency support power reserve when determining the power production capacity, the power plant controller will be better positioned to deliver the expected amount of power, while contributing to the power grid stability through use of the frequency support power reserve. Thereby penalty payments are avoided, not only for not delivering the agreed amount of power, but also for exacerbating any power grid frequency deviation by underdelivering when the grid frequency is too low or overdelivering when the grid frequency is too high. With the method of the invention, a wind farm is not only capable to provide reliable forecasts of the power it can produce and to deliver an amount of electric power in accordance with these forecasts, but it can simultaneously contribute to keeping the grid frequency close to the nominal grid frequency (typically 50 Hz or 60 Hz). When the actual grid frequency drops below the nominal grid frequency, it is even more important for the wind farm not to deliver less electric power than the power production forecast, in order to contribute to the grid stability and avoid additional penalty payments. Similarly, when the actual grid frequency significantly exceeds the nominal grid frequency, delivering power in excess to the power production forecast is to be avoided. Depending on the size and course of the grid frequency error ($f_{error}=f_{measure}-f_{nominal}$), the initially received power production forecast can then be adjusted to ensure that both the power production and the frequency support of the wind farm meet the requirements defined by the network operator. The frequency support power reserve may either be positive or negative and its size may depend on the size and the course of the grid frequency error. When additional power may be needed for grid frequency control, the power production capacity may be decreased accordingly. With a negative frequency support power reserve, the power production capacity may be decreased. By taking into account the frequency support power reserve when determining the power production capacity, the ability of the power plant to deliver power in accordance with the power production forecast is increased, allowing the wind farm to meet the expectations of the network operator, to contribute to the stability of the power grid and to avoid penalty payments.

Optionally, the frequency support power reserve is further determined in dependence of a rate of change of the actual grid frequency. For example, when the grid frequency error, i.e. the difference between the actual and the nominal grid frequency, is large, but already decreasing, a smaller frequency support power reserve may be needed than when the grid frequency error is large and increasing. By taking into account the rate of change of the grid frequency error (or of the actual grid frequency), the power production capacity determining algorithm can react quicker, and therefore more accurately, to changes in demands for grid frequency compensation.

The power production capacity may further be based on a power forecasting error, representing a difference between the received power production forecast and the actual power production. Additionally, the adjustment may be based on a rate of change of the power forecasting error. The rate of change of the power forecasting error may, e.g., be determined as an accumulated change of the power forecasting error over a number of time intervals. A fuzzy logic algorithm may be employed for the determining of the power production capacity.

According to a further aspect of the invention, a power plant controller is provided for controlling operation of at least one wind turbine connected to a power grid, the power plant controller being configured to perform a method as described above.

The invention further relates to a wind farm comprising at least one wind turbine and one such power plant controller, the power plant controller being operatively connected to the at least one wind turbine for controlling the at least one wind turbine.

BRIEF DESCRIPTION OF THE DRAWINGS

Embodiments of the invention will now be described by way of example with reference to the accompanying drawings, in which.

DETAILED DESCRIPTION

Figure 1:
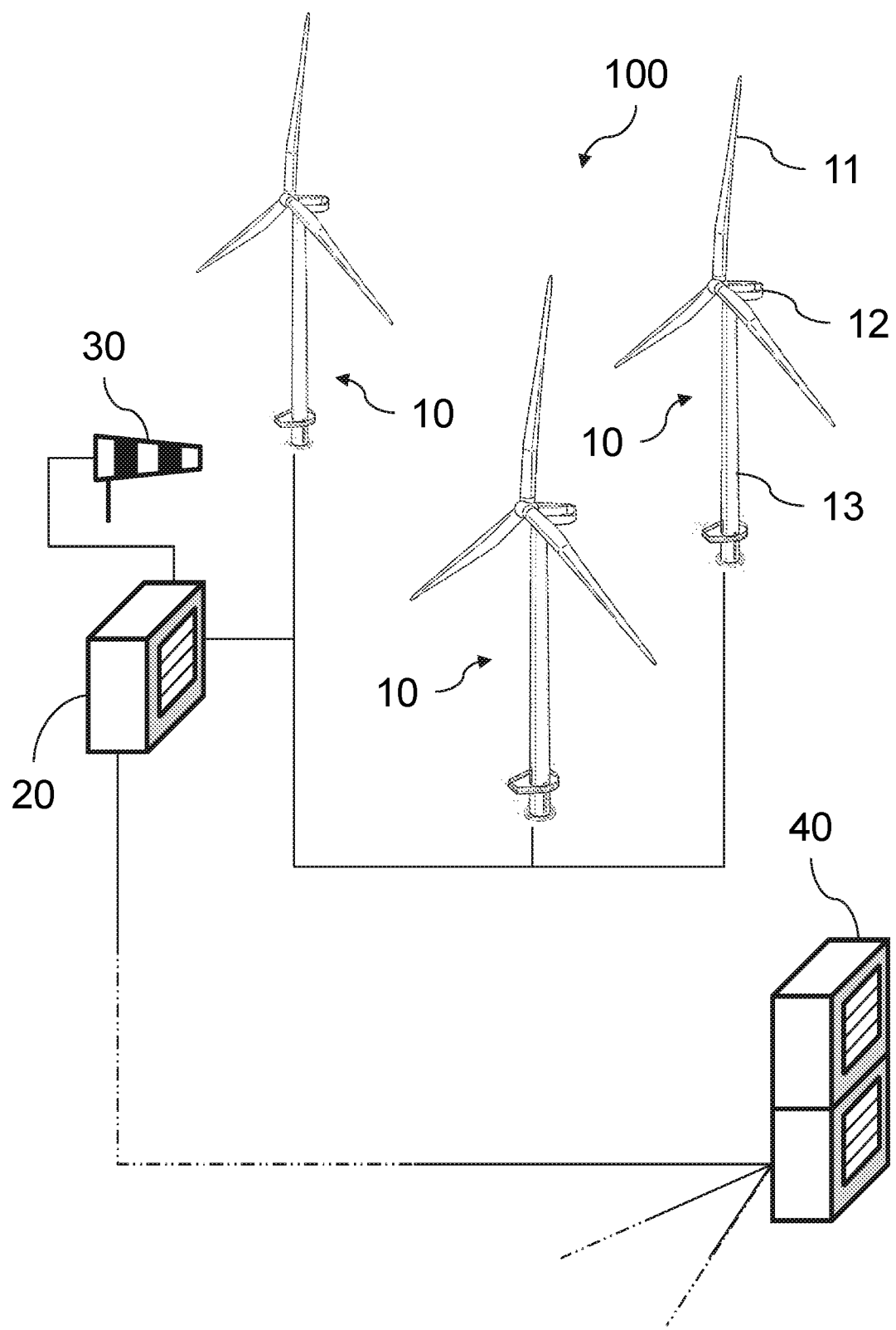
FIG. 1 schematically shows a wind farm connected to a power grid.

FIG. 1 schematically shows a wind farm 100 connected to a power grid. The wind farm 100 comprises a number of wind turbines 10, three of which are shown in the schematic representation. The wind turbines 10 are designed to convert wind energy into rotary motion of its rotor blades 11. The rotor blades 11 are coupled to a nacelle 12, via a rotor that drives a generator that is located inside the nacelle 12. The generator converts the rotary motion into electric power. The electric power is transported down the wind turbine tower 13 for delivery to the power grid. For the control of the operation of the wind turbines 10, each wind turbine 10 comprises its own wind turbine controller. The wind turbine 10 may comprise sensing equipment for monitoring operational data, such as produced power, rotor speed, local wind speed, hours of operation, etc. Although the wind turbines 10 shown in this schematic representation are off-shore wind turbines 10, the current invention is equally applicable to on-shore wind turbines.

A central wind farm controller 20, is operatively coupled to the individual wind turbine controllers to centrally gather operational data from the individual wind turbines 10 and to align the control strategies of the individual wind turbines 10 in the wind farm 100. Such alignment is needed to ensure that the total supply of electric power by the wind farm 100 matches the demand, also in the event of varying wind conditions or mechanical failure at one or more of the wind turbines 10 in the wind farm 100. The wind farm controller 20 may be physically located in or at one of the individual wind turbines 10, or in a separate building located at the same geographical site as the wind farm 100 itself. Alternatively, the wind farm controller 20 may be located remotely or its functionality may be distributed over multiple locations.

If located at the wind farm 100 itself, the wind farm controller 20 may be coupled to a central wind sensor 30 for monitoring the wind speed and direction at the location of the wind farm. As an alternative or in addition thereto, wind turbines 10 may each have their own wind sensors for allowing even more accurate monitoring of real-time wind conditions.

The wind farm controller 20 is further operatively coupled to a central power grid controller 40 that may be located anywhere in the power grid. The central power grid controller 40 communicates with wind farm controllers 20 of multiple wind farms 100 at different locations, with the objective to match the total supply of and demand for electric power from the wind farms 100 connected to the power grid. As described in, e.g., WO 2019/238185 A1, a power grid controller 40 may use weather forecasts and information about the wind turbines 10 in the wind farms 100 in order to generate a power production forecast for the respective wind farm 100. The wind farm controller 20 receives this power production forecast and controls the wind farm 100 accordingly, with the aim to deliver the amount of electric power expected by the power grid controller. When the wind farm 100 delivers less power, this will lead to reduced revenue and the stability of the grid may be compromised. When the wind farm 100 delivers more power, this will reduce the stability of the grid too and penalty payments may have to be paid to the network operator or other authorities.

Wind farm specific data, gathered at the wind turbines 10 and/or at the wind farm controller 20 may be used to adjust the power production forecast as received from a third party forecast provider, such as the central power grid controller 40. For example, when local wind speed data shows that the wind turbines 10 can produce more electric power than expected, one or more of the wind turbines 10 may be temporarily downrated. When one of the wind turbines 10 produces less power than expected, e.g. due to mechanical problems, the other wind turbines 10 may be instructed to temporarily produce more electric power, such that the total power supplied by the wind farm keeps in line with the original power production forecast.

Figure 2:
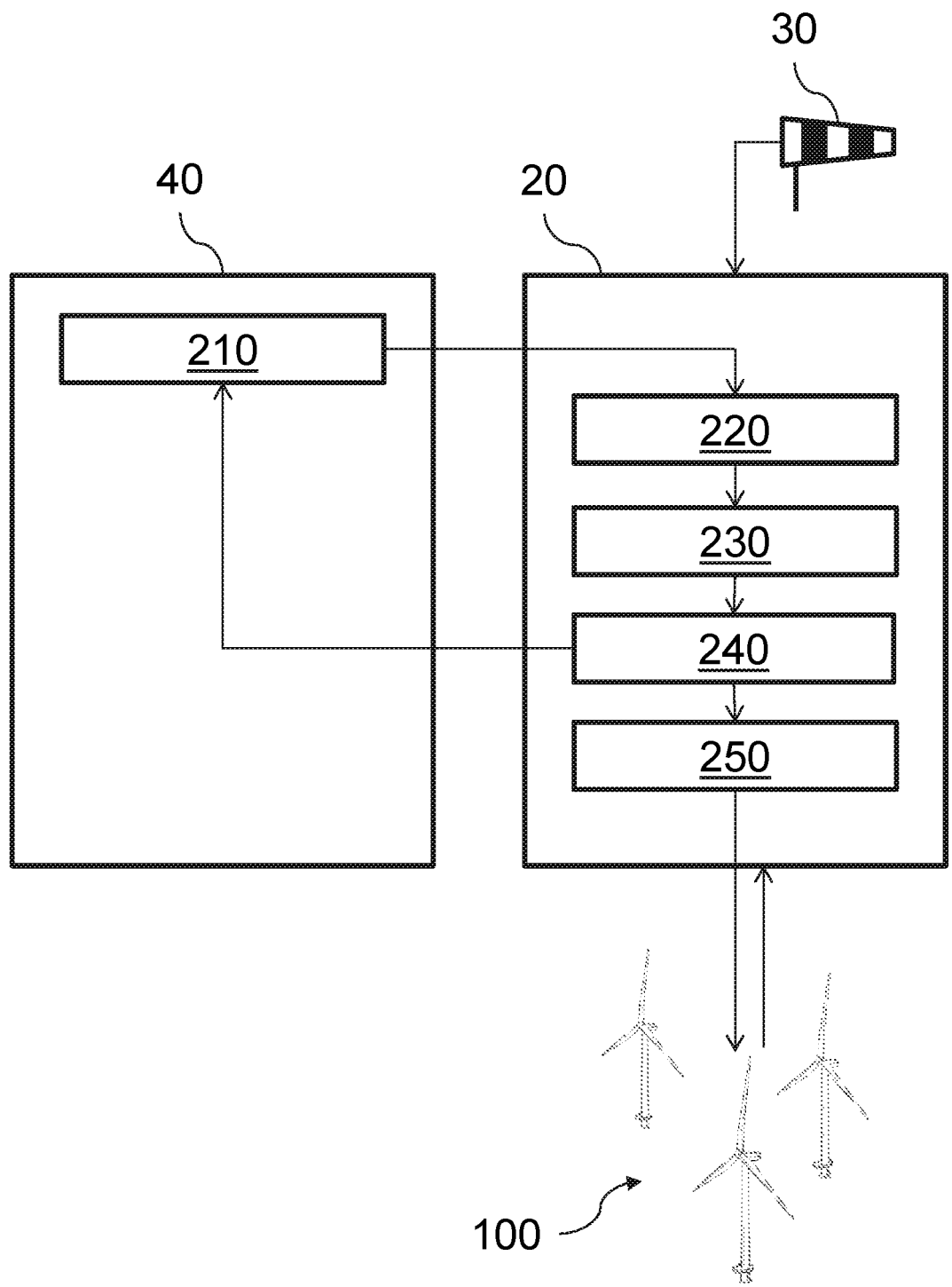
FIG. 2 shows a flow diagram of a method according to the invention.

FIG. 2 shows a flow diagram of a method according to the invention. It is noted that the control method visualised in this figure is just one example of a method according to the invention. Alternative methods falling within the scope of the claims are foreseeable, some of which will also be discussed below.

The method starts with a central forecast 210 made by the central power grid controller 40 or some other third party forecast provider. Information about the wind farm 100, such as the number and type of wind turbines 10, historic power production data and maintenance schedules is combined with weather forecasts for the geographical location of the wind farm, in order to make an as accurate as possible estimation of the amount of electric power the wind farm 100 will be able to produce in an upcoming time window of, e.g. 5 minutes, 10 minutes, 1 hour or a full day. Based on the combined power production forecasts of all the wind farms 100 on the power grid, the central power grid controller 40 can then also make a forecast of the total amount of electric power that can be produced by all the wind turbines 10 on the power grid together. This information may then be used to come up with a strategy to match the supply and demand of electric power on the power grid as a whole. Wind farms 100 and other power plants connected to the grid are then instructed to deliver their share of the required electric power.

In a forecast receiving step 220, the wind farm controller 20 receives the power production forecast that has just been submitted by the power grid controller 40. In most situations, the power production forecast will correspond to the amount of electric power the wind farm 100 is expected to produce in the relevant time frame. Based on this power production forecast, the wind farm controller 20 will determine a power production capacity that may be used as a target for controlling the power delivery by the wind turbines 10 in the wind farm 100. In times of low demand, the wind farm controller 20 may further receive a power dispatch reference from the power grid controller 40, such an externally provided power dispatch reference can, e.g., be expressed as a percentage (typically $\leq 100\%$) of the power production forecast. Additionally, an upper and lower power delivery limit may be received, representing a range of power output values that will ensure that electric power demands are met and power grid stability can be maintained.

Alternatively, such upper and lower power delivery limits may be fixed percentages or amounts of kilowatt hours that the provided power is allowed to differ from the power production forecast or power dispatch reference.

Then, while power production continues, the wind farm controller 20 monitors the wind farm operation in monitoring step 230. Aspects of the wind farm operation that may be monitored include the power production of each of the wind turbines 10, variations in local wind speed, and power grid frequency. The data needed for this monitoring step 230 is primarily obtained by sensors of the wind turbines 10, but may also come from functional equipment that is part of the wind farm 100 and shared by multiple wind turbines 10. For example, weather stations may monitor weather conditions for all or a subset of the wind turbines 10 and the wind farm controller itself may be directly coupled to a sensor for monitoring the grid frequency.

All this locally gathered monitoring data is then used to determine the power production capacity and/or to adjust the power production forecast received from the central power grid controller 40, in a production capacity determining step 240. Preferably, this step is performed continuously or periodically at a frequency that is higher than the frequency with which new power production forecasts are provided by the central power grid controller 40. For example, the central power production forecasts are generated and communicated every 10 minutes and the wind farm controller 20 locally adjusts the power production capacity every 1 or 2 minutes to ensure that the wind farm 100 can be controlled in such a way that it will produce electric power in accordance with the forecasts and delivery targets provided by the central power grid controller 40.

When, e.g., wind speeds are higher than expected and it is established that the wind farm 100 produces more electric power than would have been expected in view of the centrally provided power production forecast, the power production capacity may locally exceed the forecast. In a subsequent control step 250, one or more of the wind turbine 10 may then be downrated in order to ensure that the wind farm 100 will not overload the grid.

For a quicker and more accurate response to changes in the power production capacity of the wind farm, the wind farm controller preferably monitors not just the difference between the forecasted and the actual power production ($P_{error}=P_{forecast}-P_{measured}$), but also the rate of change of this forecasting error ($dP_{error}/df$). For example, when the actual power production is below the original forecast, but the rate of change of the forecasting error is such that the forecasted power production can be expected to increase soon, there may be no need to temporarily overrate one or more of the wind turbines 10. However, if the rate of change of the forecasting error indicates that the forecasting error may be growing, it may be useful to temporarily overrate one or more of the wind turbines 10.

The rate of change of the forecasting error may be calculated in different ways. For example, at the moment $t=T_N$, the rate of change of the forecasting error ($P_{error}$) may just be the average change of the forecasting error since the previous measurement at $t=T_{N-1}$:

$$\frac{dP_{error}}{dt} = \frac{P_{error,N} - P_{error,N-1}}{T_N - T_{N-1}}$$

Alternatively, a trend in the change of the forecasting error at the moment $t=T_n$ may be established by considering an accumulated change and direction over a number of time periods, since receiving the central power production forecast at $t=T_0$:

$$\sum_{N=1}^{n} \frac{P_{error,T_N} - P_{error,T_0}}{n}$$

In addition to the forecasting error and its development over time, also the grid frequency is used as an input parameter for determining the power production capacity. For the operation of a stable power grid, it is important that the grid frequency is kept within a narrow grid frequency bandwidth around the nominal grid frequency that is typically 50 or 60 Hz. The actual grid frequency is typically measured by integrating the grid frequency over a predetermined time interval and dividing the integrated value by the duration of the time interval to obtain an average grid frequency. When the actual grid frequency drops below the nominal grid frequency, it is even more important for the wind farm 100 not to deliver less electric power than the power production forecast, in order to contribute to the grid stability and avoid additional penalty payments. Similarly, when the actual grid frequency significantly exceeds the nominal grid frequency, delivering power in excess to the power production forecast is to be avoided. Depending on the size and course of the grid frequency error ($f_{error}=f_{measure}-f_{nominal}$), the determined power production capacity may then be adjusted and production targets may be adapted to ensure that both the power production and the frequency support of the wind farm 100 meet the requirements defined by the network operator. The grid frequency error is typically measured by sampling the grid frequency at 4 second intervals and averaging the measured frequency over a 1 minute period, but other measurement strategies may be used as well.

In an embodiment of the invention, the wind farm controller 20 monitors the actual grid frequency and possible also the rate of change of the actual grid frequency and determines a frequency support power reserve which may be added to the original or previously adjusted power production forecast in order to ensure that the wind farm 100 can play its role in the power grid frequency stabilisation. The frequency support power reserve may either be positive or negative and its size may depend on the size and the course of the grid frequency error. When additional power may be needed for grid frequency control, the power production forecast is adjusted downward. With a negative frequency support power reserve, the power production forecast can be adjusted upward. Like with the actual power production, responsiveness and accuracy may be improved by further taking into account a rate of change of the frequency error ($df_{error}/df$).

The determining of the power production capacity and the adjustment of the power production forecast based on multiple input parameters may be realised using a linear function with predetermined gain factors for each of the input parameters taken into account. Alternatively, more complex mathematical function may be used. Another suitable method for determining or adjusting the power production capacity and the power production forecast is the use of fuzzy logic algorithms. Such fuzzy logic algorithms use fuzzy membership functions to relate the input parameter values to corresponding classified levels. A rule based system and a further fuzzy membership function then translates the classified levels of the input signals to an output value that can be multiplied by a gain factor to determine the power production capacity or the adjusted power production forecast.

When the power production capacity has been determined, the wind turbines 10 in the wind farm 100 are controlled accordingly in control step 250. For example, a power production capacity that exceeds the power production forecast may lead to a downrating of one or more of the wind turbines 10.

Optionally, when due to changing circumstances the amount of electrical power that can be delivered deviates from the originally received power production forecast, adjusted power production forecasts are communicated to the central power grid controller 40. The power grid controller 40 may then use this information for improving the accuracy of any future forecasts. Significant downward adjustments of the power production forecast may trigger the central power grid controller 40 to instruct other power plants to produce additional power in order to compensate for the expected decline in power production at the wind farm 100.

The invention claimed is:

1. A method of determining a power production capacity for at least one wind turbine connected to a power grid, the method comprising:
   receiving a power production forecast for the at least one wind turbine;
   monitoring an actual power production of the at least one turbine;
   determining a power forecasting error based on a comparison of the power production forecast and the actual power production;
   adjusting the power production forecast in dependence of the power forecasting error;
   monitoring an actual grid frequency of the power grid;
   determining a frequency support power reserve in dependence of a nominal grid frequency and a rate of change of the actual grid frequency;
   determining the power production capacity in dependence of the determined frequency support power reserve and the adjusted power production forecast, wherein the power production capacity comprises a lower power production limit and an upper power production limit; and
   controlling operation of the at least one wind turbine based, at least in part, on the power production capacity.

2. The method of claim 1, wherein the frequency support power reserve is increased when the actual grid frequency is below the nominal grid frequency or reduced when the actual grid frequency is above the nominal grid frequency.

3. The method of claim 1, further comprising determining a rate of change of the power forecasting error, and adjusting the received power production forecast in dependence of the rate of change of the power forecasting error.

4. The method of claim 3, wherein the rate of change of the power forecasting error is determined as an accumulated change of the power forecasting error over a number of time intervals.

5. The method of claim 1, wherein the determining the power production capacity employs a fuzzy logic algorithm.

6. The method of claim 1, wherein the power production capacity is forwarded to a grid operator.

7. The method of claim 6 wherein the grid operator generates a power reference based on the power production capacity and wherein the at least one turbine is controlled in accordance with the power reference.

8. The method of claim 1, wherein the power production forecast is based, at least in part, on weather forecasts for a geographical location of the at least one wind turbine.

9. A power plant controller for controlling operation of at least one wind turbine connected to a power grid, the power plant controller, comprising:
   a communication interface;
   one or more processors configured to perform operations, comprising:
      receiving, via the communication interface, a power production forecast for the at least one wind turbine;
      monitoring an actual power production of the at least one turbine;
      determining a power forecasting error based on a comparison of the power production forecast and the actual power production;
      adjusting the power production forecast in dependence of the power forecasting error;
      monitoring an actual grid frequency of the power grid;
      determining a frequency support power reserve in dependence of a nominal grid frequency and a rate of change of the actual grid frequency;
      determining the power production capacity in dependence of the determined frequency support power reserve and the adjusted power production forecast, wherein the power production capacity comprises a lower power production limit and an upper power production limit; and
      controlling operation of the at least one wind turbine based, at least in part, on the power production capacity.

10. A wind farm, comprising:
at least one wind turbine connected to a power grid; and
a power plant controller operatively connected to the at least one wind turbine and comprising:
   a communication interface; and
   one or more processors configured to perform an operation, comprising:
      receiving, via the communication interface, a power production forecast for the at least one wind turbine;
      monitoring an actual power production of the at least one turbine;
      determining a power forecasting error based on a comparison of the power production forecast and the actual power production;
      adjusting the power production forecast in dependence of the power forecasting error;
      monitoring an actual grid frequency of the power grid;
      determining a frequency support power reserve in dependence of a nominal grid frequency and a rate of change of the actual grid frequency;
      determining the power production capacity in dependence of the determined frequency support power reserve and the adjusted power production forecast, wherein the power production capacity comprises a lower power production limit and an upper power production limit; and
      controlling operation of the at least one wind turbine based, at least in part, on the power production capacity.

* * * * *